Aug. 29, 1950     R. E. RANTS     2,520,654
FISH-LINE SINKER
Filed Nov. 25, 1947
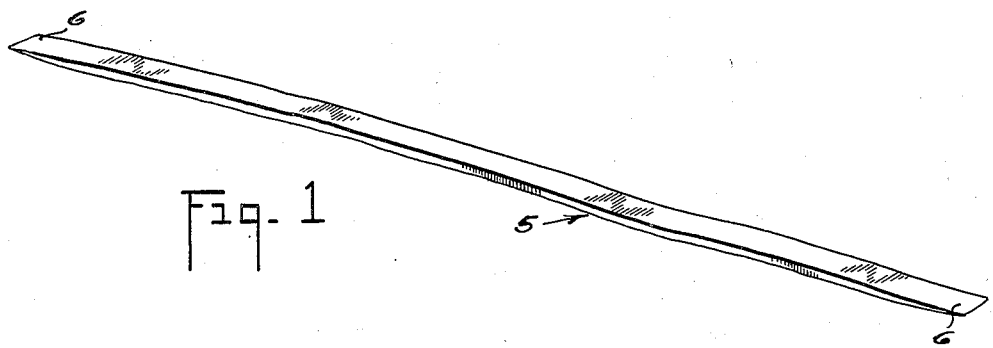
Fig. 1
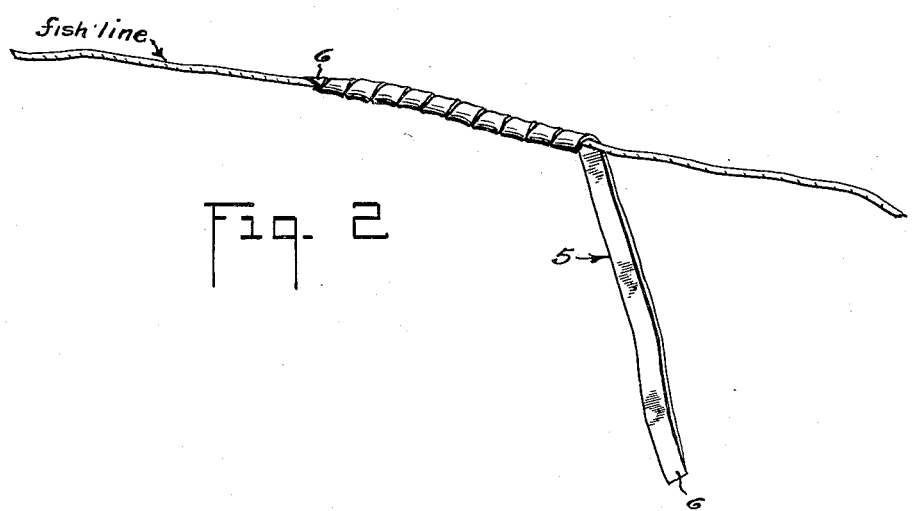
Fig. 2
Fig. 3
INVENTOR.
ROLAND E. RANTS
ATTORNEY Patented Aug. 29, 1950

2,520,654

UNITED STATES PATENT OFFICE 2,520,654

FISHLINE SINKER

Roland E. Rants, Bellingham, Wash.

Application November 25, 1947, Serial No. 788,025

2 Claims. (Cl. 43—44.89)

This invention relates to the art of weighting a fishing line, and is directed to the provision of an advanced type of sinker device which introduces an entirely new technique considered from the standpoint of its mode of application. The sinker of the present invention, although it is applicable to the weighting of trolling lines, more especially lends itself to use on casting lines and particularly those carrying either a fly or a single-egg hook as the lure.

As a particular object, the invention aims to provide a sinker device which can be easily and expeditiously applied to or removed from a line with no liability of damaging the latter.

It is a still further and important object to devise an especially versatile sinker which, from a tackle-box stocked with only a very few sizes, gives to the user an unusually wide selection of available weights.

A yet further object is to provide a sinker device which conforms very closely to the contour of the line, protruding only slightly therefrom and consequently allowing the sinker to travel freely through weeds and the like with little likelihood of hanging up or of having any suspended matter present in the water attaching itself to the sinker.

A further object still is to provide a sinker device which will admit of being drawn through the line-guides of a fishing rod and thus enable the weight to be applied to the line in comparatively distal relation to the lure while still permitting a fisherman to draw a hooked fish into sufficiently close proximity to allow the fish to be readily netted.

With the above and other still more particular objects and advantages in view and which will appear and be understood in the course of the following description and claims, the invention consists in the new method of weighting a fishing line and in the novel construction of a sinker device for practicing said method.

In the accompanying drawing:

Figure 1 is a perspective view illustrating a sinker device formed in accordance with the teachings of the present invention.

Fig. 2 is a view illustrating said sinker device in process of being wrapped upon a fishing line, the line being shown fragmentarily; and Fig. 3 is a view showing the sinker device as it finally appears when the wrapping step has been completed.

According to the present invention, there is employed an elongated narrow ribbon of metal denoted by the numeral 5 and which, desirably, is composed of lead due to the fact that this metal best lends itself to the accomplishment of my objects, by which I mean to say that this metal has the desirable characteristics of high specific gravity while being also extremely pliable and having negative elasticity. There are, however, instances in which it may be advantageous to use a metal other than lead similarly lacking in elasticity but lighter in weight for a given mass, and I consequently do not intend to restrict the present invention to the use either of lead or of lead alloys as the material of the ribbon's composition. This ribbon is or may be produced to various widths, thicknesses and lengths, and it is desirable, although not essential, that the two ends be tapered as at 6.

In using the weight, the procedure is one of wrapping the ribbon helically upon the fish line, and this end is best accomplished by working in opposite directions from the center, and which is to say by folding the ribbon centrally, or approximately centrally, of the length and laying the produced bite over the line, then developing the helical wrap by winding the ribbon in opposite directions progressively therefrom, first wrapping one end and then wrapping the other end and drawing each convolution rather snugly upon the line. As the tapered ends are finally drawn in and molded to the contour of the line, there results a sinker which spans a rather appreciable portion of the line but which has a diameter only slightly exceeding that of the line itself, which by the cone shape of its ends obviates the presence of any abrupt terminal shoulders, and which is quite flexible. The sinker is firmly held upon the line against possibility of endwise slippage but attains its grip without imparting any destructive pinching and there is consequently no liability of weakening the line below the test figure for which it is produced. The ribbon can be readily removed by simply unwinding the same, and can then be easily straightened, replaced in the tackle box, and again used as occasion requires. It will be understood that the tapering of the tip ends, although desirable, is not essential inasmuch as the extremities will still snug down quite closely to the line and, while the terminal shoulders are perforce somewhat more abrupt than occurs when the ends are tapered, the degree of projection is so minor that there is evidenced little tendency for the shoulder to pick up any submerged matter present in the water.

The instant weighting device is unusually versatile in that a user may take, say, a half-ounce ribbon and can fractionally divide this piece at any desired point within its length to obtain an unusually fine scaling to substantially the exact weight which any fisherman might desire. In furtherance of the possible usage of metals other than lead, the sole advantage in so doing would be that of enabling a user to apply weights lighter than even the shortest usable ribbon of lead would permit, thus to satisfy the need of substantially any fly fisherman irrespective of how light a fly may be applied to his line.

The invention will, it is thought, have been clearly understood from the foregoing description.

What I claim is:

1. The described sinker for a fish line comprised of a ribbon of lead composition having a pliability characteristic enabling the same to be handwound as a helical wrap upon the line and having the terminal ends tapered to an approximate knife-edge thickness.

2. A weighted fish line, comprising in combination, a length of fish line and an elongated thin ribbon of lead composition having its terminal ends tapered to an approximate knife-edge thickness, said ribbon being helically and tightly wrapped around a short portion of said line with said tapered ends in flush engagement with said line.

ROLAND E. RANTS.

REFERENCES CITED

The following references are of record in the file of this patent:

UNITED STATES PATENTS

| Number | Name | Date |
|---|---|---|
| 399,866 | Gage | Mar. 19, 1889 |
| 508,681 | Coey | Nov. 14, 1893 |
| 2,222,277 | Baker | Nov. 19, 1940 |
| 2,458,243 | Biddle | Jan. 4, 1949 |

FOREIGN PATENTS

| Number | Country | Date |
|---|---|---|
| 818,314 | France | June 14, 1937 |